United States Patent
Byrne et al.

(10) Patent No.: US 7,496,475 B2
(45) Date of Patent: Feb. 24, 2009

(54) MAINTENANCE MANAGEMENT OF A MACHINE

(75) Inventors: Brian Dara Byrne, Poway, CA (US); Kevin Brady, San Marcos, CA (US); Arthur Stack, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 11/606,175

(22) Filed: Nov. 30, 2006

(65) Prior Publication Data

US 2008/0133178 A1  Jun. 5, 2008

(51) Int. Cl.
*G06F 11/30* (2006.01)

(52) U.S. Cl. ...................................................... 702/184
(58) Field of Classification Search ........................ None
See application file for complete search history.

(56) References Cited

U.S. PATENT DOCUMENTS

| | | |
|---|---|---|
| 5,737,215 A | 4/1998 | Schricker et al. |
| 6,119,074 A | 9/2000 | Sarangapani |
| 6,343,251 B1 | 1/2002 | Herron et al. |
| 6,363,332 B1 | 3/2002 | Rangarajan et al. |
| 6,408,258 B1 | 6/2002 | Richer |
| 6,442,511 B1 | 8/2002 | Sarangapani et al. |
| 6,466,858 B1 | 10/2002 | Adibhatla et al. |
| 6,473,677 B1 | 10/2002 | Hershey et al. |
| 6,490,543 B1 | 12/2002 | Jaw |
| 6,532,412 B2 | 3/2003 | Adibhatla et al. |
| 6,633,782 B1 | 10/2003 | Schleiss et al. |
| 6,643,801 B1 | 11/2003 | Jammu et al. |
| 6,691,064 B2 | 2/2004 | Vroman |
| 6,728,619 B2 | 4/2004 | Adachi et al. |
| 6,810,406 B2 | 10/2004 | Schlabach et al. |
| 6,836,539 B2 | 12/2004 | Katou et al. |
| 6,871,160 B2 | 3/2005 | Jaw |
| 6,922,656 B2 | 7/2005 | Butler et al. |
| 6,959,235 B1 | 10/2005 | Abdel-Malek et al. |
| 6,968,293 B2 | 11/2005 | Wiegand |
| 6,985,803 B2 | 1/2006 | Abdel-Malek et al. |
| 7,050,943 B2 | 5/2006 | Kauffman et al. |

(Continued)

FOREIGN PATENT DOCUMENTS

JP         59060037 A    4/1984

(Continued)

*Primary Examiner*—Bryan Bui
*Assistant Examiner*—Jonathan Teixeira Moffat
(74) *Attorney, Agent, or Firm*—Finnegan, Henderson, Farabow, Garrett & Dunner (57) ABSTRACT

Methods of providing maintenance management of a machine are disclosed. In one embodiment, the method involves identifying a machine component failure that, if not repaired, will result in a functional failure of the machine. A criticality factor is assigned to the machine component failure based on at least a probability of occurrence of the functional failure and a consequence of the functional failure to a machine user. A maintenance task is generated to repair the machine component failure, and a triggering condition that activates the maintenance task is defined. The method further involves conducting a machine repair in response to a detection of the triggering condition, and maintaining a record that includes information relating to the conducted machine repair. The method of providing maintenance management is also modified based on at least the record.

23 Claims, 6 Drawing Sheets

U.S. PATENT DOCUMENTS

| | | |
|---|---|---|
| 7,051,044 B1 | 5/2006 | Fera et al. |
| 2003/0004679 A1 | 1/2003 | Tryon, III et al. |
| 2003/0055666 A1* | 3/2003 | Roddy et al. .................... 705/1 |
| 2003/0149548 A1 | 8/2003 | Mosses et al. |
| 2004/0153437 A1* | 8/2004 | Buchan ......................... 707/1 |

FOREIGN PATENT DOCUMENTS

| | | |
|---|---|---|
| JP | 09032039 A | 2/1997 |
| JP | 2002099642 A | 4/2002 |
| JP | 2003203127 A | 7/2003 |
| JP | 2003208217 A | 7/2003 |

* cited by examiner

MAINTENANCE MANAGEMENT OF A MACHINE

TECHNICAL FIELD

The present disclosure relates generally to maintenance management, and more particularly to a method of managing maintenance of a machine.

BACKGROUND

The profitability of an organization that utilizes machines in its operation is dependent on its ability to effectively maintain the machines in a manner that optimizes their reliability and performance. For instance, the profitability of an organization that provides maintenance service for machinery through long-term maintenance contracts relies on its ability to maintain the machines in good working order at the lowest cost. The importance of an efficient maintenance management approach become all the more important when numerous machines have to be maintained in various geographic sites around the world. Currently, maintenance of such machines are performed in an ad-hoc manner and the performance of each service contract is reliant on the experience and expertise of specific contract management personnel, resulting in varying performances for different service contracts.

U.S. Pat. No. 6,836,539 (the '539 patent) to Katou et al. describes a machine maintenance management method to quickly and accurately repair machines that operate at remote locations under severe conditions. The method of the '539 patent uses an electronic control unit (ECU) attached to the machine to monitor an operating condition of the machine. The monitored operating condition is then transmitted to a monitoring facility. When the monitored operating condition indicates a failure of the machine, the ECU determines the cause of the failure and communicates repair instructions to repair personnel. The method of the '539 patent further includes placing purchase orders for replacement parts to reduce down-time of the machine during repair.

Although the maintenance management method of the '539 patent may reduce the time taken to repair a machine at a remote location, this method only addresses machine repair after a failure has occurred. The method of the '539 patent does not provide for preventive maintenance of the machine to prevent a failure. Nor does the approach of the '539 patent allow for monitoring of the machine operating condition to identify a condition where failure may be imminent, and facilitate repair of the machine before the failure actually occurs. Additionally, the approach of the '539 patent may not be optimized to account for the challenges of simultaneous management of many maintenance contracts each comprising numerous machines.

The disclosed maintenance management system is directed to overcoming one or more of the problems set forth above.

SUMMARY OF THE INVENTION

In one aspect, the present disclosure is directed to a method of providing maintenance management of a machine. The method involves identifying a machine component failure that, if not repaired, will result in a functional failure of the machine. A criticality factor is assigned to the machine component failure based on at least a probability of occurrence of the functional failure and a consequence of the functional failure to a machine user. A maintenance task is generated to repair the machine component failure, and a triggering condition that activates the maintenance task is defined. The method further involves conducting a machine repair in response to a detection of the triggering condition, and maintaining a record that includes information relating to the conducted machine repair. The method of providing maintenance management is also modified based on at least the record.

In another aspect, the present disclosure is directed to a method of providing maintenance management of a machine. The method involves classifying a machine failure as a critical failure or a non-critical failure based on at least a potential effect of the machine failure on a machine user and a probability of the machine failure, and identifying a critical failure of the machine based on an indicator reflecting a likelihood of the critical failure. The method also includes conducting a first machine maintenance before an occurrence of the critical failure, and conducting a second machine maintenance after an occurrence of the non-critical failure. The method further includes determining an effectiveness of at least one of the first machine maintenance and the second machine maintenance, and modifying the method of maintenance management based on the determined effectiveness.

In yet another aspect, the present disclosure is directed to a method of providing maintenance management of a machine. The method includes classifying a machine failure mode based on a criticality value, and developing a predictive maintenance task to repair the machine failure mode with the criticality value exceeding a predetermined value. The method also includes developing a preventive maintenance task to repair the machine failure mode with the criticality value exceeding a predetermined value, and developing a reactive maintenance task to repair the machine failure mode with the criticality value below a predetermined value. The method also involves executing one of the predictive maintenance task, the preventive maintenance task, or the reactive maintenance task on an occurrence of the failure mode, and maintaining a record that includes information related to the execution of the predictive maintenance task, the preventive maintenance task, or the reactive maintenance task. The method further includes calculating a performance metric based on the record.

DETAILED DESCRIPTION

Reference will now be made in detail to exemplary embodiments, which are illustrated in the accompanying drawings. Wherever possible, the same reference numbers will be used throughout the drawings to refer to the same or like parts/steps. In the description that follows, FIG. 1 will be used to describe a system for performing an embodiment of the disclosed maintenance management process for a machine, and FIG. 2 will be used to provide a general overview of the maintenance management process. FIGS. 3 through 6 will then describe the details of different steps involved in the process of FIG. 2.

Figure 1:
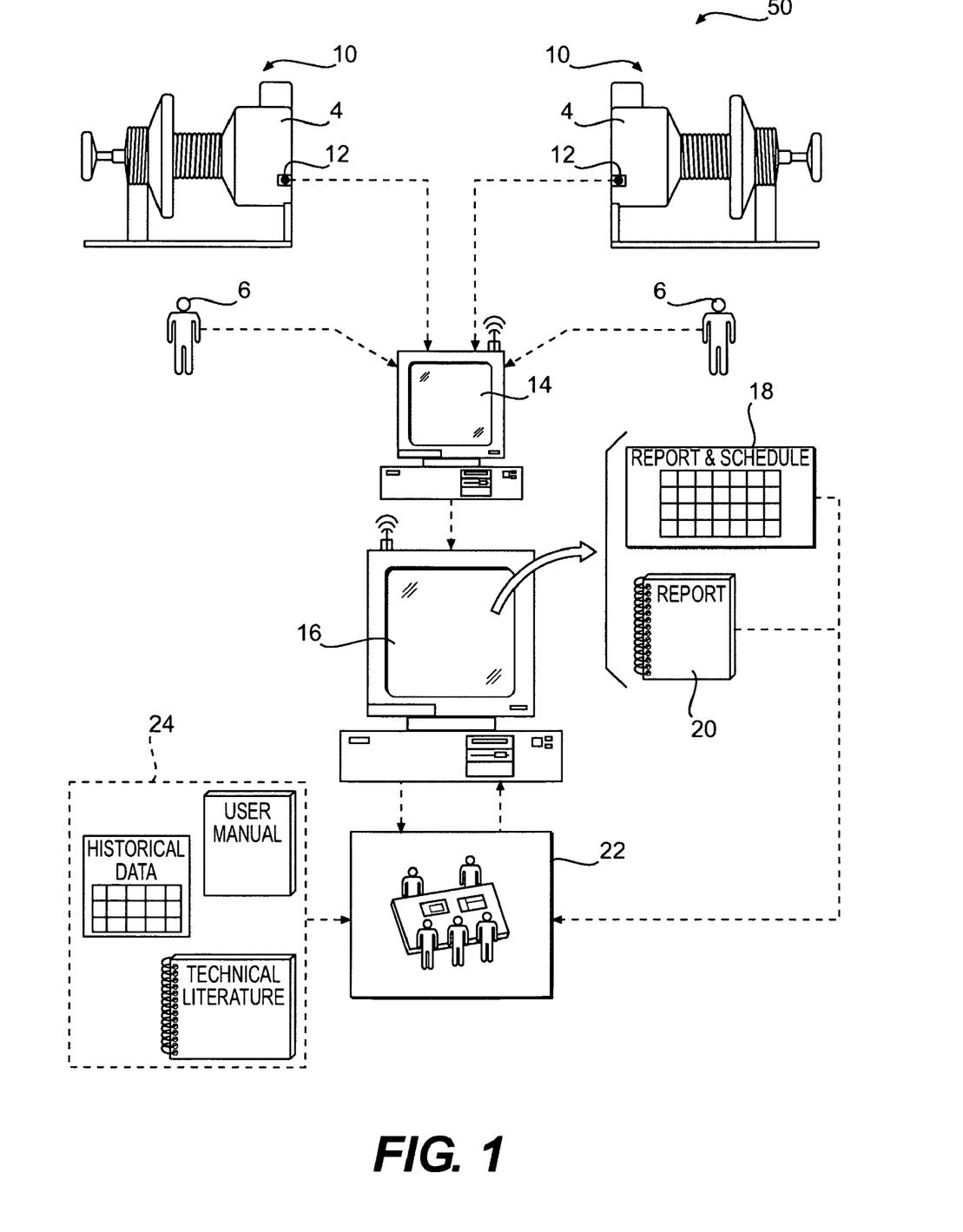
FIG. 1 is a schematic illustration of an exemplary maintenance management system consistent with certain disclosed embodiments.

A machine 4, as the term is used herein, may include a fixed or mobile machine that performs some sort of operation associated with a particular industry, such as mining, construction, farming, power generation, etc. Non-limiting examples of a fixed machine may include turbines, power production systems, or engine systems operating in a plant or an off-shore environment. Non-limiting examples of a mobile machine may include trucks, cranes, earth moving vehicles, mining vehicles, backhoes, material handling equipment, marine vessels, aircraft, and any other type of movable machine that operates in a work environment. The term machine 4 also encompasses a plurality of similar or dissimilar machines, geographically located at the same or different places. For example, the term machine 4 may refer to a single fork-lift truck in a plant, a fleet of mining vehicles at a mine-site in Australia, a collection of turbines at various oil-fields around the world, or to a group encompassing the fork-lift truck, haul vehicles and the turbines. The location where a machine 4 operates will be referred to as a worksite 10. The term worksite also encompasses a single or a plurality of locations where the machine 4 operates. A person who works with the machine 4 will be referred to as a machine user 6. The machine user 6 may include an individual, group or a company that operates the machine 4. The machine user 6 may also include personnel of a company or a group assigned the task of maintenance of the machine 4 (service contractor), and repair technicians who perform the maintenance.

FIG. 1 illustrates a maintenance management system 50 for performing maintenance management of a machine 4. The machine 4 may be one of multiple machines that may be located at multiple worksites or at the same worksite 10. The machine 4 may include one or more sensors 12 that measure some characteristic of the machine 4. For instance, the machine 4 may include temperature sensors that detect the temperature at a location of the machine 4. In some cases, the measured characteristic may indicate an incipient defect of the machine 4. The sensors 12 may communicate the measured data of the machine 4 to a machine interface module 14. The machine interface module 14 may include a computer system or other also data collection system. The communication of the data from the sensors 12 to the machine interface module 14 may be continuous or periodic, and may be accomplished through a wired connection or a wireless setup. The machine interface module 14 may be portable or fixed, and may be located proximate or remote to the machine 4.

A machine user 6 may also input data into the machine interface module 14. The data inputted by the machine user 6 may include data related to a status of the machine 4. For instance, the data input by the machine user 6 may include data related to the daily operation of the machine 4, the maintenance of machine 4, or a defect observed on the machine 4. The machine user 6 may electronically input the data (for instance, through an input device), or manually record the data (on one or more log books), which may then be input into the machine interface module 14.

The machine interface module 14 may transmit data to a machine monitoring system 16. The machine monitoring system 16 may include a computer system or a plurality of computer systems networked together. It is also contemplated that computers at different locations may be networked together to form the machine monitoring system 16. The machine monitoring system 16 may include software configured to perform analysis, a database to store data and results of the analysis, a display device and/or an output device configured to output the data and the results to a machine user 6. The data transmitted by the machine interface module 14 may include data measured by the sensors 12 and data recorded by the machine user 6. This transmission of data to the machine monitoring system 16 may be continuous or periodic, and may be accomplished by any means known in the art. For instance, the data transmission may be accomplished using the word wide web, a wireless communication system, a wired connection, or by transferring a recording medium (flash memory, floppy disk, etc.) between the machine interface module 14 and the machine monitoring system 16. The machine monitoring system 16 may be located proximate to the worksite 10 or may be situated in a remote location. The machine monitoring system 16 may be configured to record data from multiple machine interface modules 14 located at different geographic locations. In some instances, multiple machine interface modules 14 located in different continents may transmit data to a machine monitoring system 16. It is also contemplated that in some cases, a separate machine interface module 14 may be eliminated and the sensor data and the machine user data may be input directly into the machine monitoring system 16. The machine monitoring system 16 may perform analysis (using a software configured to do the analysis) on the data transmitted by the machine interface module 14 along with other data stored in the machine monitoring system 16. The analysis may include any logic based operation on the data that produce some results. These results may include a maintenance schedule 18 of the machine 4 and reports 20 that may indicate the effectiveness the maintenance management plan. The machine monitoring system 16 may also be configured to automatically update other logistical planning systems, such as, for example, an inventory management system and/or a personnel scheduling system, based on the maintenance schedule 18. The machine monitoring system 16 may also communicate data from multiple machine interface modules 14 to a management team 22.

The management team 22 may be composed of machine users 6 responsible for managing the maintenance operation. The management team 22 may review information related to the data reported by one or more machine interface modules 14 along with other technical data 24 related to the maintenance of machine 4. The technical data 24 may include historical maintenance information, machine user manuals, knowledge gained from previous experience and other machine technical information. The management team 22 may analyze the reviewed information and develop a maintenance plan for the machine 4. This maintenance plan may be input into the machine monitoring system 16. The management team 22 may also review the results (for example, the maintenance schedule 18 and the reports 20) produced by the machine monitoring system 16 to modify the maintenance plan. In some applications, the membership of the management team 22 that modifies the maintenance plan may be different than the membership of the management team 22 that develops the maintenance plan.

Figure 2:
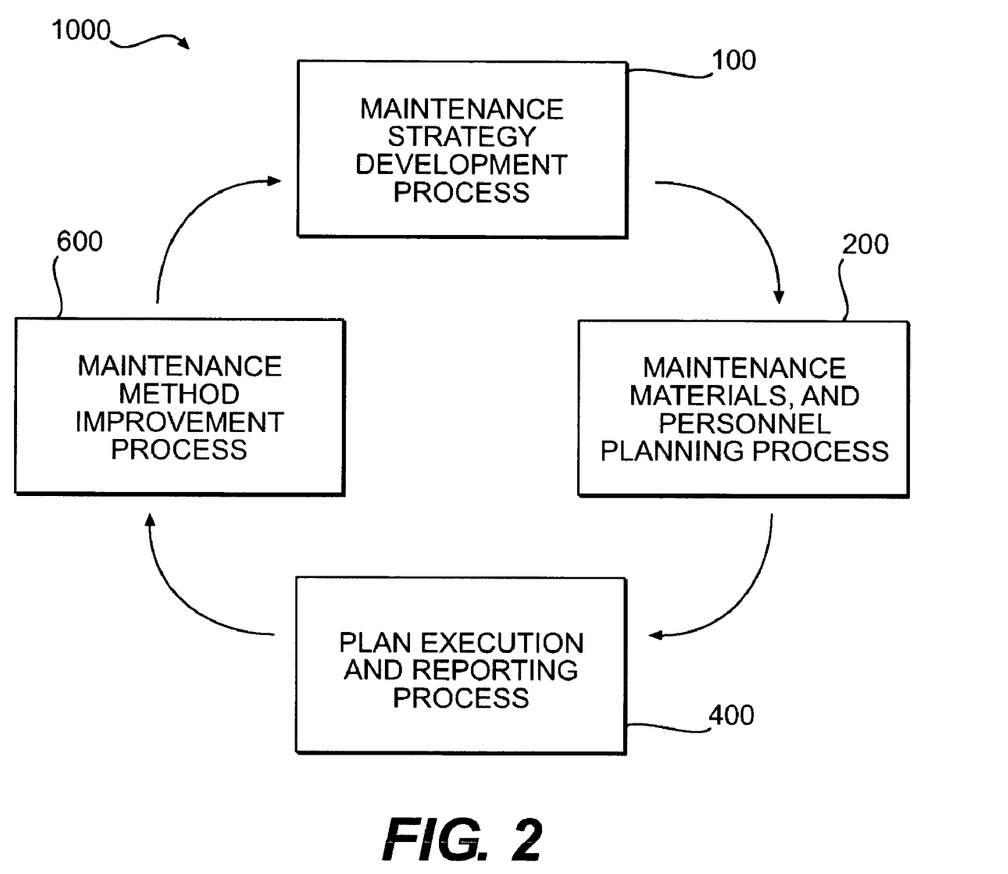
FIG. 2 is a diagrammatic illustration of an exemplary maintenance management process for the system of FIG. 1 consistent with certain disclosed embodiments.

FIG. 2 depicts an overview of the maintenance management process 1000 that may be carried out by the maintenance management system 50 of FIG. 1. The maintenance management process 1000 may involve a maintenance strategy development process 100. In the maintenance strategy development process 100, the management team 22 may generate machine failure modes based on information of likely machine failures, worksite specific use conditions, and machine technical data 24. In some applications, the machine monitoring system 16 may assist or may even automatically generate the failure modes for machine 4. The machine failure modes may include a list of all potential failures that affect the functionality of the machine 4. Worksite specific use conditions may include information on environmental and/or safety concerns and/or standards that may exist at a particular worksite 10. The management team 22 may also assign a criticality factor to the generated failure modes. The criticality factor may include information on the level of importance the machine user 6 assigns to a particular machine 4. For instance, information that a particular machine 4 is used as a backup machine, which can tolerate a few hours of planned down-time a week, may be used to assign a low criticality factor to the machine 4. The output of the maintenance strategy development process 100 may include a maintenance plan for the machine 4.

Following development of maintenance strategy for the machine 4, the management team 22 may perform the maintenance, materials, and personnel planning process 200. Maintenance planning may include development of maintenance procedures and plans for each failure mode identified in step 100. For instance, maintenance planning may include determination of the frequency of a maintenance operation, such as, for example an oil change, and procedures to be followed for performing an oil change. The management team 22 may also determine the materials, tools, and personnel needed to perform the maintenance procedure at this stage. For instance, the spare parts and tools that will be needed to repair a certain failure, and the necessary skills needed for the repair may be determined. It is also contemplated, that in some cases, the machine monitoring system 16 may automatically develop the maintenance procedures and plans for a failure mode. This automatic development of maintenance procedures by the machine monitoring system 16 may be partly or wholly based on information of prior failures stored in a database of the machine monitoring system 16. The management team 22 and/or the machine monitoring system 16 may also schedule tool time, and/or repair personnel time in the respective scheduling systems.

The maintenance plans developed by the management team 22 and/or the machine monitoring system 16 in step 200 may then be executed by the machine user 6 in step 400. The machine user 6 may also report details of the execution to the machine interface module 14 (or to the machine monitoring system 16 directly in those embodiments without a machine interface module 14) in step 400. For instance, the maintenance plan (developed in the maintenance strategy development step 100) may call for the replacement of an air filter of a machine 4 when the pressure drop across the air filter exceeds a pre-defined value. When sensors 12 indicate that the pressure drop across the filter exceeds the pre-defined value, the machine user 6 assigned to the maintenance task may execute the prescribed maintenance procedures for replacing the air filter (as defined by the management team 22 in step 200). Following the maintenance event, the machine user 6 may report the details of the repair conducted to the machine interface module 14. The record may include specifics of the repair operation, such as the time taken to repair, machine down-time, cost incurred in the repair process, etc. The machine interface module 14 may transmit the record to the machine monitoring system 16. In some cases, the machine interface module 14 may compile the records of multiple maintenance tasks and transmit the compiled record to the machine monitoring system 16. The machine monitoring system 16 may create a report 20 summarizing details of execution of the maintenance plan. The report 20 may also include performance indicators that may indicate the health of the maintenance operation. The management team 22 may use these performance indicators to gauge the effectiveness of the maintenance management process 1000.

The management team 22 may analyze the report 20 and modify the maintenance process in the maintenance method improvement process (step 600). The modifications to the maintenance management process 1000 may include changes to the defined failure modes, their criticality factors, classification of the maintenance tasks, the procedures used for a specific maintenance, and/or any other changes to improve the maintenance management process 1000. It is also contemplated that performance indicators from one maintenance project may be used to modify the maintenance management process 1000 of another maintenance project. For instance, the performance indicators of a turbine maintenance project at one worksite 10 may indicate that the allowable pressure drop across a filter can be increased without adverse results. This information may be used to modify a turbine maintenance project at another worksite 10.

The description above describes a general overview of the maintenance management process 1000. FIGS. 3 through 6 will now be used to further describe the details of the different steps involved in the maintenance management process 1000.

Figure 3:
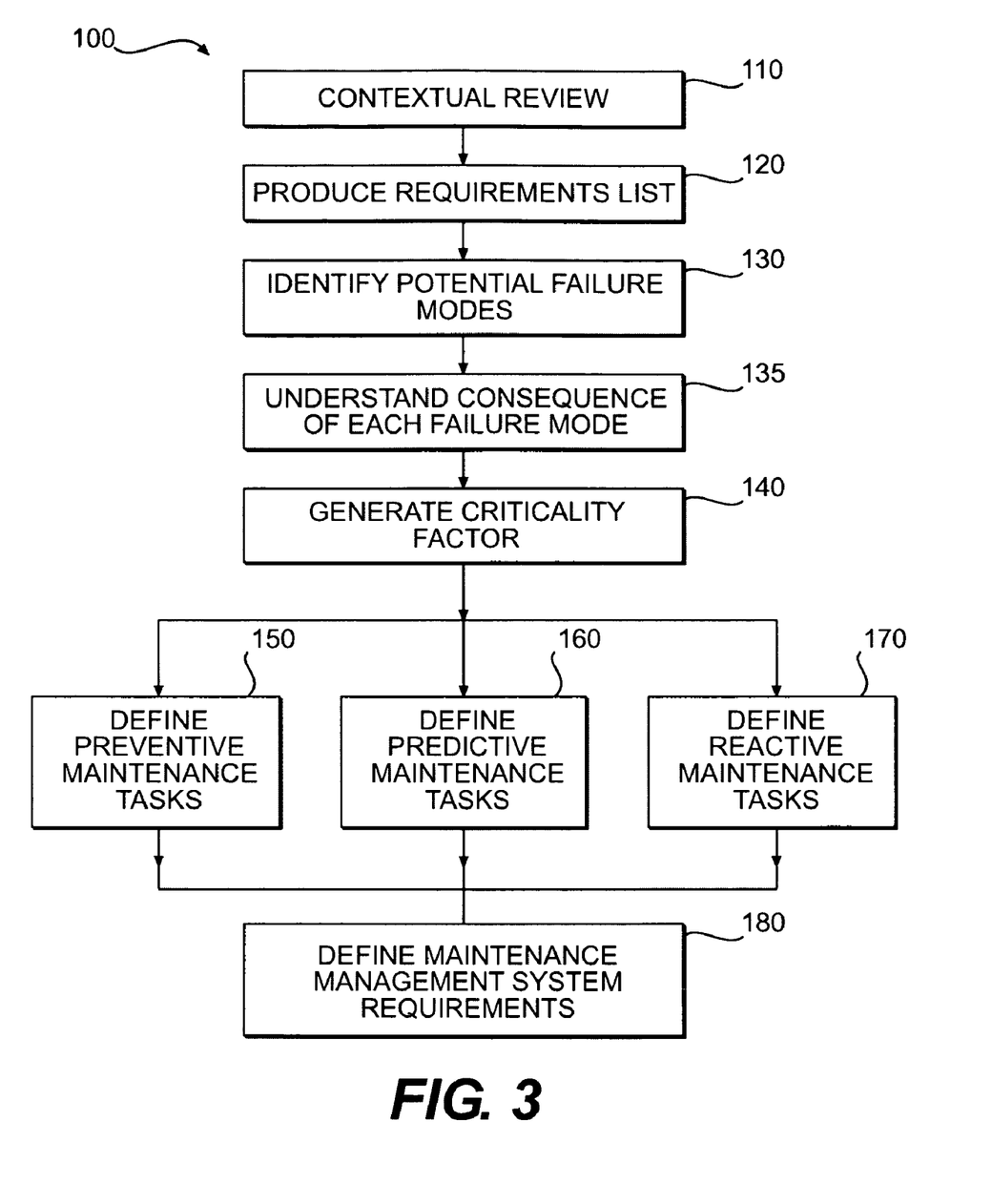
FIG. 3 is a flowchart of an exemplary maintenance strategy development process of FIG. 2 consistent with certain disclosed embodiments.

FIG. 3 illustrates the steps involved in the maintenance strategy development process (step 100 of FIG. 2). Development of the maintenance strategy may include a contextual review 110. The management team 22 along with the machine monitoring system 16 may perform the contextual review 110. During the contextual review 110, the management team 22 may discuss the objectives for a maintenance project, along with any specific worksite related constraints. Information covered during the contextual review 110 may include, the operating philosophy of the machine user 6 and the maintenance contractor, machine availability requirements, machine use conditions describing the amount of time that a particular machine operates and the conditions under which it operates, criticality of the machine 4 to the machine user 6, operational projections which may impact the use of the machine 4, seasonal changes that may impact machine use and condition, environmental considerations (for e.g., local regulations that impact use of the machine), accountability during a maintenance event (for e.g., responsibility for support systems such as protective enclosures, etc.), maintenance schedule for other equipment in the worksite 10 (for e.g., how will the maintenance schedule of equipment not covered in a maintenance plan affect the maintenance schedule of a machine 4 covered in the plan), worksite constraints (for e.g., number of repair personnel allowed at one time, offshore versus onshore, etc.), performance requirements (for e.g., required response time for different failures, performance targets, training requirements, etc.), condition of the machine 4 (for e.g., machine age, review of prior maintenance records, etc.), and other information that may directly or peripherally impact the maintenance of the machine 4.

Based on the contextual review 110, the management team 22 or the machine monitoring system 16 may produce a requirements list (step 120). The requirements list may describe the key requirements and constraints of the maintenance project. For instance, the requirements list may assign a priority to a machine 4 based on the priorities of the machine user 6. The requirements list may also include incentives/penalties for meeting/not meeting performance goals.

After the maintenance requirement list is created, the management team 22 and/or the machine monitoring system 16 may identify possible failure modes of the machine 4 (step 130). In some applications, the management team 22 along with machine experts may conduct a brainstorm session to identify the possible failure modes of the machine 4. These machine experts may include representatives of the machine manufacturer and/or machine users 6 who have technical and/or practical knowledge of the machine. In other applications, the machine monitoring system 16 may automatically generate the failure modes for the machine 4. For example, information from a maintenance project of a similar machine 4 at another worksite 10 stored in a database of the machine monitoring system 16 along with other machine related information may be used to automatically generate the possible failure modes of the machine 4. It is also contemplated that the machine user 6 and the machine monitoring system 16 may also jointly identify the potential failure modes of the machine 4. The process of identifying the failure modes may include performing a Reliability Centered Maintenance (RCM) analysis. RCM analysis is a process of systematically analyzing an machine 4 made up several components, to attribute the cause of each possible functional failure of the machine to one or more components. The general steps involved in the RCM analysis for a machine 4 may include, partitioning the machine 4 into components, and assigning the cause of each functional failure to one or more of these components. The RCM analysis may be conducted afresh for a project or it may be reused from another project.

To partition the machine 4 into components, the management team 22 may partition the machine 4 into different functional groups that define an operational characteristic of the machine 4. For example, the management team 22 may partition a turbine into functional groups, such as electrical system, fuel system, gear box, lube oil system, etc., based on the function of the different groups. These functional groups may be further partitioned into components until a failure mode may be identified with each discrete component. For instance, the fuel system of the previous example may be further partitioned into several components such as supply lines, gas check transmitter, HI start Q switch, off skid block valve, torch gas system exciter, torch gas system igniter, torch gas system solenoid valve, etc. The management team 22 and the machine monitoring system 16 may also determine the probability of occurrence of each identified failure mode. These probabilities may be determined based on prior knowledge, equipment supplier data, or by other means. For example, maintenance data from another maintenance project of a similar machine 4, stored in the database of the machine monitoring system 16 may be used to determine the probability of occurrence of the failure modes. A probability value may also be assigned to each failure mode based on the probability of its occurrence. In some cases, the probability value may be a numerical value that ranges between set values, such as from 1 to 5, with 1 indicating a low probability of occurrence and 5 indicating a high probability of occurrence. It is also contemplated that other probability representations may be implemented.

Once the potential failure modes have been identified and the probability of their occurrence determined, the next step is to understand the consequence of these failures (step 135) to the machine user 6. The failure modes identified in step 130 may result in a functional failure of the machine 4. The process of understanding the consequence of a failure mode (step 135) captures the effect of the functional failure to the machine user 6. The management team 22 may use the information from contextual review 110 to understand the impact of a failure mode to the machine user 6. Failure mode Effect and Criticality Analysis (FMECA) may be used to establish a cause and effect relationship among different failure modes and functional failure of the machine 4. For example, an FMECA on a fuel system failure mode, such as, for example, the inability to regulate gas supply to a turbine (machine 4) during startup, may attribute this failure to a defect in some or all of the fuel system components, such as, for example, the gas check transmitter, HI start Q switch, and the off skid block valve. The management team 22 may also assign a consequence value to each failure mode to indicate the seriousness of the consequences of a failure mode. The consequence value may vary between a set range of values, such as a scale from 1 to 10 (1 being low and 10 being severe). It is also contemplated that other types of consequence values may be implemented. The specific consequence value assigned to each failure mode may be based on technical experience, failure analysis review, and available historical data. For instance, during contextual review 110, the machine user 6 (or a software process executed by the machine monitoring system 16 or another computer) may indicate that a down-time of a certain machine 4 exceeding eight hours will shut-down a process line of the machine user 6, causing serious financial repercussions. Based on this information, a consequence value of 8 may be assigned to all failure modes that may take more than eight hours to repair. This example is not intended to be limiting and the consequence value may be assigned based on other relationships to a machine operation.

Based on the probability of occurrence of a failure mode, the impact of the failure mode to the machine user 6, and/or other factors, the management team 22 may assign a criticality factor to each of the failure modes (step 140). The criticality factor of a failure mode may indicate its risk as compared to other failure modes. The risk of a failure mode may be a function of severity of the end effect (the effect of the functional failure that results from a particular failure mode to the machine user 6) and the likelihood of the failure mode resulting in the end effect. The criticality factor may be assessed quantitatively (as a number) or qualitatively (low to high). In some cases, the criticality factor may be assessed as a function of the probability value and the consequence value (for e.g., a product of the probability value and the consequence value) and a criticality factor above a determined value (for e.g., "9") may be considered high risk while a criticality factor below another determined value (for e.g., "4") may be considered low risk. In other cases, the criticality factor may be a qualitative indicator of risk based on the probability value and the consequence value. It is also contemplated that the criticality factor may be the result of a software process executed by the machine monitoring system 16.

Based on at least the criticality factor, the management team 22 may define the maintenance tasks. It is contemplated that in some applications, the machine monitoring system 16 may define the maintenance tasks based on input from the management team 22. These maintenance task may include preventive maintenance tasks (step 150), predictive maintenance tasks (step 160), and/or reactive maintenance task (step 170).

Preventive maintenance tasks 150 are those that may be performed at a specified interval, regardless of the condition of the machine. For example, preventive maintenance tasks may be scheduled maintenance tasks that is executed on a fixed date, or after a fixed number of hours of operation of the machine 4. The purpose of these tasks may be to prevent certain functional failures before they occur. In some applications, preventive maintenance tasks may be used to prevent failure modes which have a medium or a high criticality factor. Preventive maintenance tasks may also be defined to increase the longevity of a machine. Non-limiting examples of preventive maintenance tasks may include oil change, lubrication, filter cleaning, etc.

A predictive maintenance task 160 may be a maintenance task where machine maintenance is performed based on an indicator which indicates the onset, progression or the likelihood (hereinafter referred to as "onset") of failure. As in preventive maintenance, a predictive maintenance task may be performed before the occurrence of the failure mode to prevent the functional failure. However, unlike in preventive maintenance, a predictive maintenance task is performed only when an indicator indicates the onset of failure. In some applications, failure modes with a medium or a high criticality factor where the onset of failure can be monitored by some means may be defined as predictive maintenance tasks. The onset of failure may be detected by monitoring an indictor that is related to the relevant failure mode. The onset of failure may be a gradual degradation in performance, variations in performance, or other indications that may indicate that the component may have to be repaired. The indicators may be obtained by visual observations, electrical signals, or by some other means capable of indicating the condition of the machine 4. A change in the monitored indicator beyond a preset limit may indicate the need for repair of one or more components. For example, signals from pressure sensors at the inlet and outlet of a filter may be used as monitors for the pressure drop across the filter. In this case, the measured pressure drop across the filter may be the monitored indicator. The pressure drop across the filter exceeding a preset value may indicate the need for replacement of the filter. The preset limit may be based on technical knowledge, manufacturers data, or prior experience.

Reactive maintenance tasks 170 may include maintenance tasks that occur as a result of machine breakdown. A machine breakdown may be a functional failure of the machine 4 that results from a failure mode. A machine breakdown, that results in a reactive maintenance task, may be unexpected failures of the machine 4, or may be as a result of a run-to-failure decision. A run-to-failure decision may be a decision by the management team 22 to wait until a failure mode results in a breakdown of the machine 4 before repairing the failure mode. In some applications, failure modes with a low criticality factor may be defined as reactive maintenance tasks. Economic considerations may also play a part in the definition of preventive, predictive and reactive maintenance tasks.

After preventive, predictive and reactive maintenance tasks are defined to respond to the identified failure modes, general maintenance management system requirements may be defined (step 180) by the management team 22. The maintenance management system requirements may specify details to be recorded following a maintenance event. These details may include information such as how a repair event is initiated, data that will be recorded after a maintenance event, form and nature of the reports that compile the data, frequency of the reports, performance indicators that will be calculated, who will review the reports, and how the performance indicators will be used to optimize the maintenance management process 1000, etc.

Figure 4A:
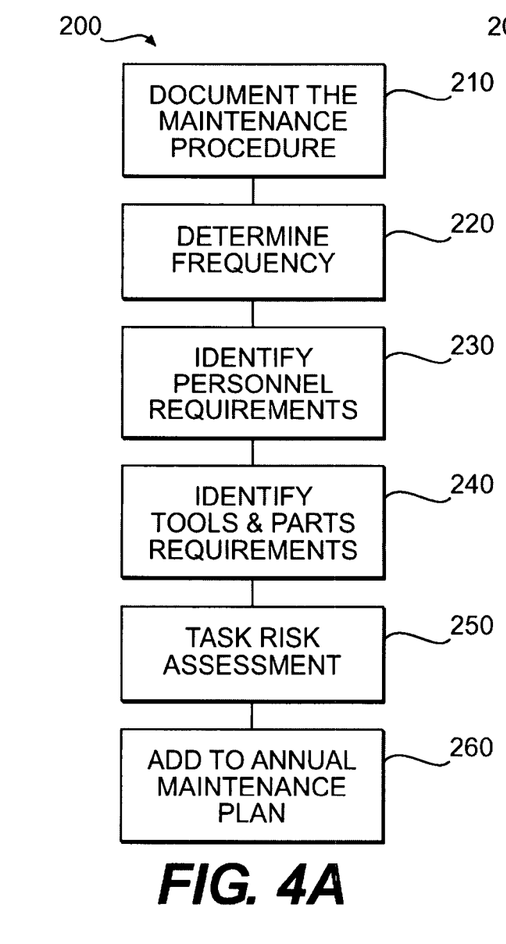
FIG. 4A is a flowchart of an exemplary maintenance, materials, and personnel planning process for a preventive maintenance task defined in FIG. 3 consistent with certain disclosed embodiments.
Figure 4B:
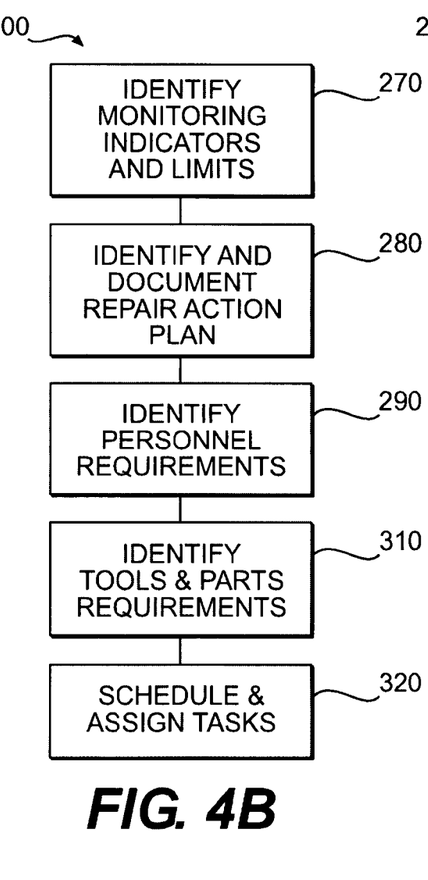
FIG. 4B is a flowchart of an exemplary maintenance, materials, and personnel planning process for a predictive maintenance task defined in FIG. 3 consistent with certain disclosed embodiments.
Figure 4C:
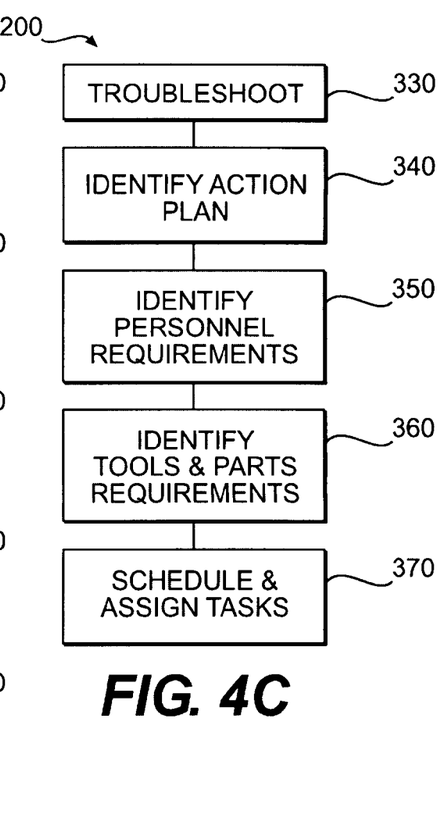
FIG. 4C is a flowchart of an exemplary maintenance, materials, and personnel planning process for a reactive maintenance task defined in FIG. 3 consistent with certain disclosed embodiments consistent with certain disclosed embodiments.

FIGS. 4A, 4B and 4C illustrate the steps involved in maintenance, materials and personnel planning for preventive maintenance tasks, predictive maintenance tasks, and reactive maintenance tasks respectively of a machine 4 (step 200 of FIG. 2).

As shown in FIG. 4A, the procedure for conducting the defined predictive maintenance tasks in step 150 may be developed and documented (step 210) by the management team 22. This procedure may include detailed step by step instructions on how to execute a predictive maintenance task. The procedures may be developed using prior experience and/or technical knowledge of the management team 22 and/or other machine users 6, and may periodically be updated to capture best known practices that are developed over time. The frequency of the preventive maintenance task may also be defined (step 220). The frequency may be specified based on a time interval or based on the number of operating hours of the machine 4. The frequency of a preventive maintenance task may also be updated periodically to capture new learnings or changed operating conditions of the machine 4. The management team 22 may define personnel requirements to perform the preventive maintenance task in step 230. The definition of personnel requirements may involve defining the number and the required skill level of the personnel to perform a repair. The need for external specialists, or specific technicians to perform a particular maintenance task may be identified. In some cases, the management team 22 and/or the machine monitoring system 16 may assign the maintenance task to particular machine users 6, and automatically schedule the repair event in these machine users 6 time management calendar. The tools and spare parts required to perform the preventive maintenance task may be identified by the management team and/or the machine monitoring system 16 in step 240. The machine monitoring system 16 may automatically upload these parts and tool requirements to an inventory management system to ensure that the requisite parts are available at the required time. The management team 22 may also identify any risks involved in the performance of the maintenance task in step 250. Technical knowledge and/or information from previous similar repairs may be used to assess the risk. Depending on the level of the risk assigned to a maintenance task, the machine monitoring system 16 or a machine user 6 may activate specific safety procedures, safety personnel, or operational modifications to address the risk. The preventive maintenance task may be included in the annual maintenance plan by the machine monitoring system 16 in step 260. If the frequency of the maintenance task is defined based on a time interval, the specific calendar date may be entered into the annual maintenance plan. If the frequency is based on the number of operating hours of the machine, an approximate date may be entered. In some cases, the machine monitoring system 16 may frequently update this approximate date as needed.

FIG. 4B illustrates the steps involved in the maintenance, materials and personnel planning for a predictive maintenance task. The management team 22 may define monitoring indicators and their trigger levels for each predictive maintenance task in step 270. These monitoring indicators may be automatic, manual or semi-automatic. For instance, in some cases a sensor signal may be used as an automatic indicator for a maintenance task, and a preset level of the sensor signal may trigger the maintenance task. In other cases, an observation by a machine user 6 may serve as a manual indicator to trigger a preventive maintenance task. An input from an operator based on another signal or an alarm may also serve as a semi-automatic indicator for a maintenance task. Once the indictors and their trigger levels are defined for each predictive maintenance task, the management team 22 may define detailed steps to perform the predictive maintenance task in step 280. The management team 22 may then define the personnel needed to perform the maintenance operation in step 290. As in the case of predictive maintenance, the need for external specialists, or specific technicians to perform a maintenance task may also be identified. In some cases, based on the progression of the indicator signal, the machine monitoring system 16 may provide advance notice of the impending maintenance task the machine user 6 assigned the repair, and/or other relevant parties. The management team 22 and/or the machine monitoring system 16 may then identify the tool and part requirements for each maintenance task in step 310. The machine monitoring system 16 may automatically upload these tool and part requirements to an inventory management system to procure parts and to make tools available at the required time. The management team 22 and/or the machine monitoring system 16 may then schedule the maintenance task in a maintenance log and assign it to one or more machine users 6 in step 320.

FIG. 4C illustrates the steps involved in the maintenance, materials and personnel planning for a reactive maintenance task. Since a reactive maintenance task are those which results from a machine breakdown (either accidental or the result of a run-to-failure decision), a machine user 6 may use the troubleshooting process of step 330 to identify the nature of the failure and the affected component. The nature of the troubleshooting process may depend on the nature of the breakdown. In some cases, extensive investigation of the machine failure may be required, while in other cases the nature of the failure may suggest the cause. Once the machine user 6 identifies the cause of the failure, the action plan to correct the failure may be identified by the machine user 6 in step 340. In some cases, the machine monitoring system 16 may assist the machine user 6 in diagnosing the defect and determining the required action plan. The action plan may specify the procedure for the corrective action required. The machine user 6 and the machine monitoring system 16 also identify the personnel, tools, and spare parts required for the maintenance task in step 350, and step 360 respectively. Once the personnel, parts and tools are identified, the machine monitoring system 16 schedule the maintenance task in a maintenance and personnel logs in step 370.

Figure 5:
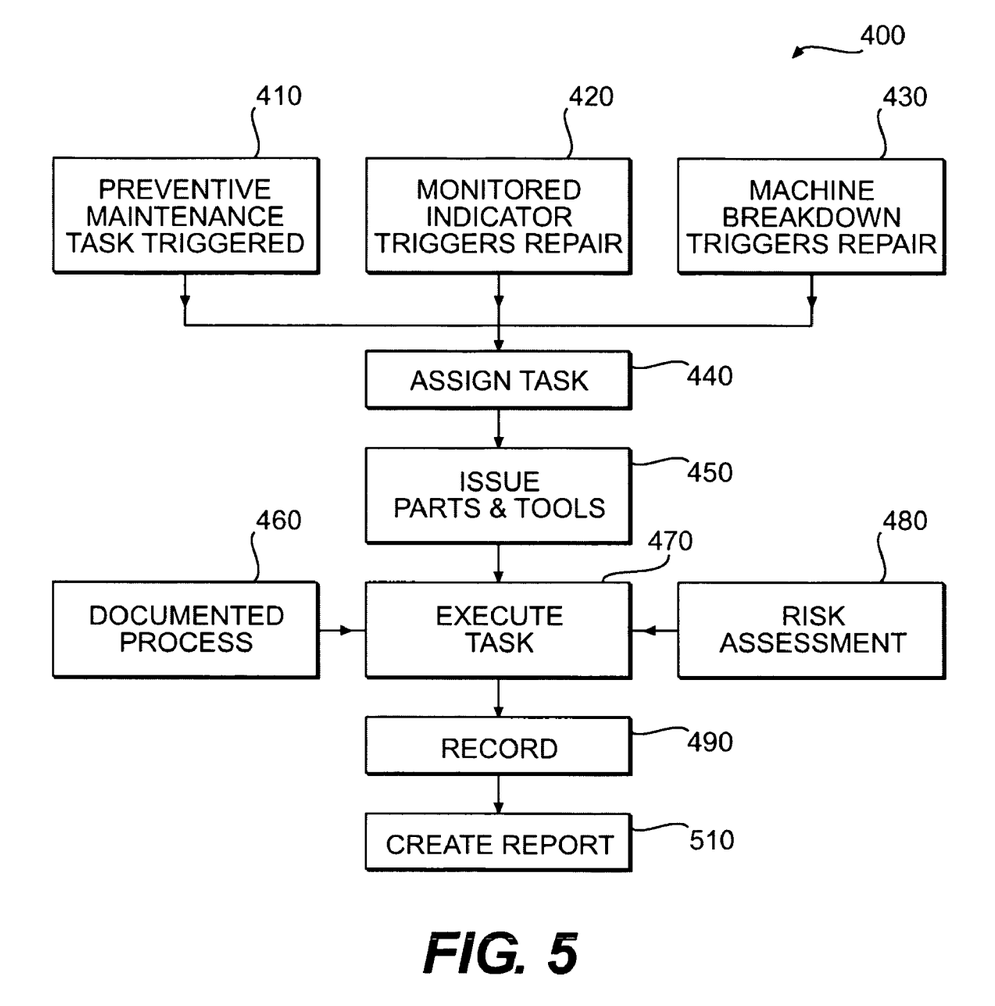
FIG. 5 is a flowchart of an exemplary plan execution and reporting process of FIG. 2 consistent with certain disclosed embodiments.

FIG. 5 shows a flowchart of the maintenance execution and reporting activities once a maintenance task is triggered (step 400 in FIG. 2). The method by which a maintenance activity is triggered may depend on the nature of the maintenance task. For instance, a preventive maintenance task may be triggered, as in step 410, at the frequency defined in step 220 of FIG. 4A. A predictive maintenance task may be triggered, as in step 420, when a monitored indicator varies from a preset limit. And, a reactive maintenance task may be triggered, as in step 430, during a machine breakdown. Once a maintenance task is triggered, the machine monitoring system 16 may generate a work order and issue it to the assigned machine user 6 (step 440). In one embodiment, the machine monitoring system 16 confirms a prior task assignment (step 260 of FIG. 4A, step 320 of FIG. 4B, and step 370 of FIG. 4C). Based on the maintenance task triggered, the machine monitoring system 16 may also request the issuance of the tools and spare parts required for the maintenance task (step 450).

The assigned machine user 6 may then execute the maintenance task in step 470. The machine user 6 may use the documented processes (step 460) to execute the maintenance task. In some cases, these documented processes may be those that were developed earlier in the maintenance management operation (for instance, in step 210 of FIG. 4A or step 280 of FIG. 4B). In other cases, documentation or knowledge learned from similar maintenance tasks at the current or different worksite 10 (past learnings) may be used. The machine user 6 may use the risk assessment of the maintenance task (step 480) to ensure that appropriate safeguards are employed during the maintenance operation. In some cases, the machine monitoring system 16 may activate safeguards or other activities based on the risk level of a maintenance task. During or after completion of the maintenance task, the machine user 6 may generate a detailed record of the maintenance operation (step 490). The information included in the record may include, the work order number, a description of the maintenance performed, the date of repair, the machine 4 repaired, the type of maintenance, machine down-time, material consumption, spare part description, labor hours, cost of purchased labor (if any), engine hours, etc. The machine user 6 may create the record in a log book, in a preprinted form, or in an electronic device. Creating the record using an electronic device may include the execution of one or more software programs by a processor. The software programs may be configured to query the machine user 6 to select pre-programmed responses that most closely represents an answer to a question. For instance, following the replacement of an air filter, the software program may prompt the machine user 6 to select a response of either "light", "moderate", or "high" to a query regarding the condition of the replaced air filter. It is also contemplated that the software programs may permit the machine user 6 to enter responses in other ways (record verbal responses, etc.).

In some cases, machine codes that indicate an overview of the maintenance task may also be included in the record (step 490). In one embodiment, the machine codes may be included only for unplanned work orders. These machine codes may be used to track maintenance activities across multiple worksites 10 and/or projects, and improve the maintenance management process 1000. The machine codes may include, among others, problem code, failure code, cause code, and an action code. The problem code may describe the impact of the failure on the machine 4. The failure code may indicate the way in which the problem manifested itself and the symptoms that were detected and/or monitored. The cause code may indicate the root cause of the failure and the factors that contributed to it. The action code may indicate the corrective action taken to resolve the problem. These machine codes may be descriptive or may be one selected from multiple options. For instance, the problem code may be assigned a value "critical" or "non-critical" based on the impact of the failure on the machine 4. The fault code may be assigned values, such as "air", "brd", "dop", "elf", etc., representing a certain type of machine failure (for example, "elf" may indicate an external leakage of fuel). The cause code may be assigned values, such as "blocked", "break", etc., that succinctly describe the root cause of the failure. The action code may also be assigned values, such as "adjust", check", etc., that concisely describe the corrective action employed.

The machine user 6 may then transfer the record to the machine interface module 14. The record may be transferred to the machine interface module 14 electronically or manually. Electronic transfer may involve transferring information to the machine interface module 14 wirelessly, by transferring information in a storage device, or through a wired connection. Manual transfer may involve transferring the information to a machine user 6 who then enters the information in the machine interface module 14. The machine interface module 14 may be located proximate to, or remote to, the machine 4. The machine interface module 14 may further transfer the record to a machine monitoring system 16. In one embodiment, the machine user 6 transfers data to a machine interface module 14 that is locally located at the worksite 10. This machine interface module 14 compiles the records of multiple maintenance events and transfers the compiled record to a central machine monitoring system 16 that receives records from multiple machine interface modules 14 located at multiple worksites 10. Information from the machine interface module 14 may be transferred to the machine monitoring system 16 wirelessly, through the world wide web, or using a wired connection. In one embodiment, the machine user 6 transfers the record directly to the machine monitoring system 16 eliminating transfer of the record to a machine interface module 14.

Based on a record, or multiple records, the machine monitoring system 16 may generate a report (step 510). In some cases, multiple reports may be generated by the machine monitoring system 16. The reports may summarize one or more maintenance tasks by project, machine 4, or type of maintenance task (preventive, predictive or reactive) and may summarize records from multiple repair activities. The reports may be generated at periodic intervals (for e.g., monthly, semi-annual, annual, etc.), and may include performance indicators, such as Key Performance Indicators (KPI).

KPI may include performance indicators that reflect the performance or health of different areas of the maintenance management process 1000. These areas may include, among others, work management, inventory management, and failure management. The KPI's may be updated periodically to track the health of the maintenance management process 1000 over time.

The KPI's for the area of work management may include performance indicators that may be used to determine whether the planned maintenance intervals are adequate, and whether all failure modes have been prevented. They may also be used to determine if the uncompleted maintenance requests (backlog) can be serviced with the available resources, and to compare performance across other similar contracts. These KPI's may include "planned maintenance hours year to date," "planned maintenance orders past due," "planned maintenance work orders year to date," and "work order backlog." The "planned maintenance hours year to date" may be a percentage representation of labor hours dedicated to preventive maintenance work orders compared to labor hours for all work orders. "Planned maintenance work orders past due" may indicate the total number of preventive maintenance work orders not yet released which have a planned issue date prior to a reference day. "Planned maintenance work orders year to date" may be a percentage representation of the total number of planned maintenance work orders completed divided by the total number of work orders completed. And, the "work order backlog" may indicate the total number of open work orders that have not yet been completed.

The KPI's for the area of inventory management may be used to determine if the inventory levels that are currently maintained for a contract are appropriate. These KPI's may include performance indicators such as, "inventory growth year to date," "inventory value," and "part consumption." "Inventory growth year to date" may be a percentage representation of the change in total inventory value for a contract. This may be measured as the difference in dollar value of the parts received and the parts issued compared to the total inventory value. The "inventory value" may indicate the total value of all parts owned/stored for a particular contract. "Parts consumption" may be a running total of all work orders issued.

The KPI's for the area of failure management may include performance indicators related to unplanned work orders for a period. These KPI's may summarize the machine codes that are tracked in a record of a maintenance event, and may indicate the labor hours and money consumed in unplanned maintenance task. They may be used to compare between similar contracts, and to optimize a maintenance management system by minimizing unplanned maintenance events when it is economically feasible to do so.

Figure 6:
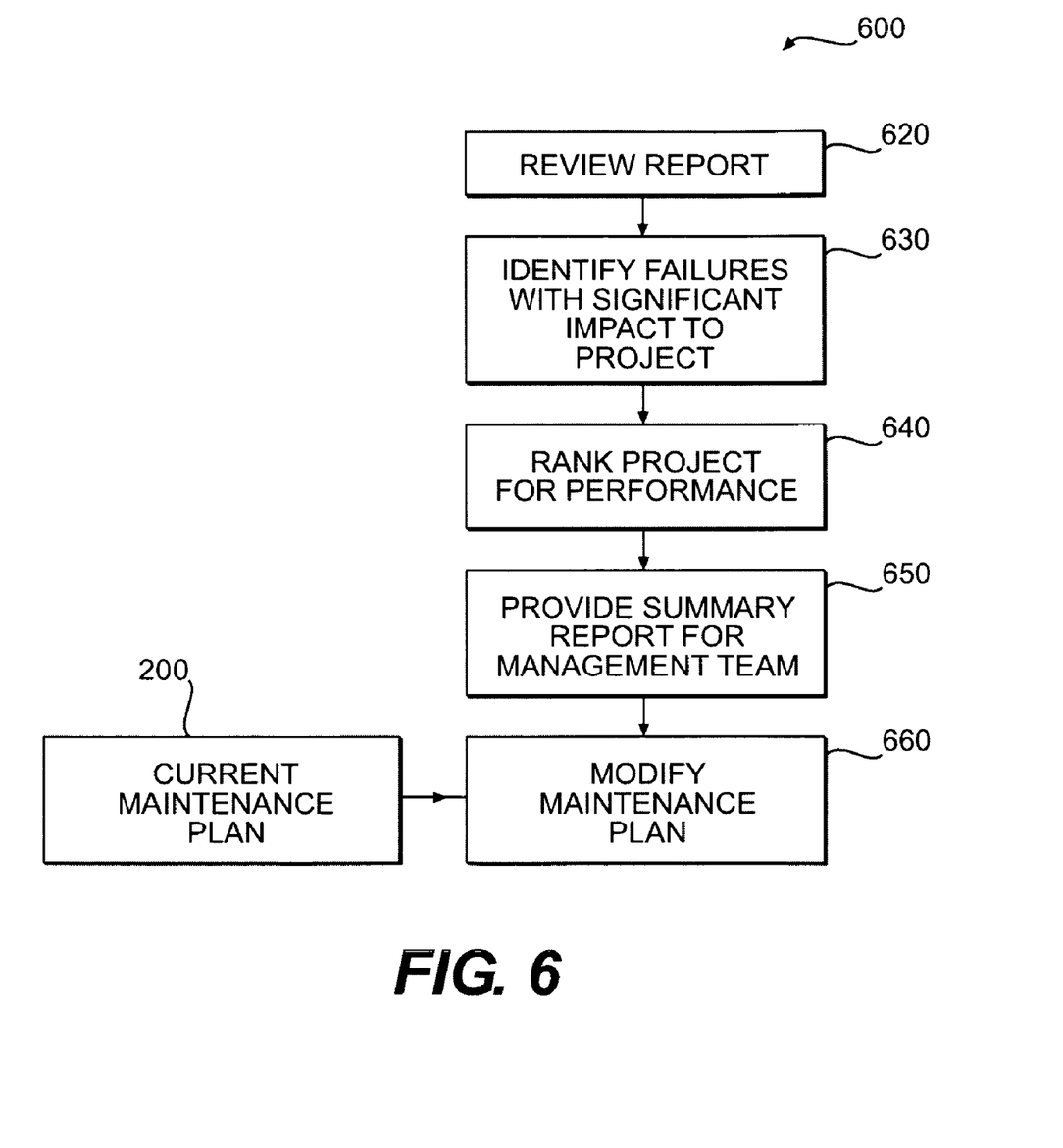
FIG. 6 is a flowchart of an exemplary maintenance method improvement process of FIG. 2 consistent with certain disclosed embodiments.

The management team 22 may use the reports and the KPI's to gage the health of the maintenance management process 1000. Based on these reports and KPI's the management team 22 may also modify any aspect of the maintenance management process 1000. Some of these modifications may be targeted to improve the performance of the maintenance management process 1000. FIG. 6 shows a flowchart of a sample analysis and improvement process 600. The periodic reports that are generated for a project may be reviewed (step 620) by the management team 22 to identify failures that have a significant impact to the project (step 630). These failures may be identified based on the KPI's generated or from the reports themselves. The management team 22 may also compare the KPI's from one worksite 10 to those from another worksite 10 to study similarities and dissimilarities (step 640). The management team 22 may create a summary report with suggested modifications to the maintenance plan. The suggested modifications may include plans to decrease the number of unplanned maintenance events (when it is economically feasible) by incorporating more preventive and predictive maintenance tasks. For instance, the failure codes of some reactive maintenance failures may indicate observable symptoms that may be tracked to predict the occurrence of the failure. A predictive maintenance task may now be designed using the observable symptom as the monitoring indicator to prevent the unforeseen occurrence of the failure. This summary report may be submitted to a project management team for approval (step 650). The project management team may be made up of machine users 6 who are authorized to modify the maintenance management process 1000. It is also contemplated that the management team 22 may include machine users 6 who are authorized to modify the maintenance management process 1000. The management team 22 may then incorporate the modifications using the machine monitoring system 16 (step 660).

INDUSTRIAL APPLICABILITY

The disclosed embodiments related to the maintenance management process 1000 may be used for maintenance management of any type and number of machines. In the disclosed maintenance management technique, a management team 22 and/or a machine monitoring system 16 identifies some or all of the possible functional failures of the machine 4 that impact its operation, and designs maintenance tasks of machine components that cause these failures. Different classes of maintenance tasks (such as, preventive, predictive and reactive maintenance tasks) are defined based on the criticality of the functional failure to the machine user 6. While both preventive and predictive maintenance tasks may be implemented to repair a component before a failure occurs, these tasks may vary in how they are triggered. Preventive maintenance tasks are those which are executed at a fixed frequency while predictive maintenance tasks are those which are triggered based on a signal that is an indication of the onset of failure. Reactive maintenance tasks repair or replace a component after a failure occurs. Reactive maintenance tasks may be unexpected failures that are not preempted by a preventive or predictive maintenance task. Reactive maintenance tasks may include repair that are more economical to fix after they occur.

The management team 22 and/or the machine monitoring system 16 may also define procedures to carry out some or all of the defined maintenance tasks. In some embodiments, the procedures may be published and provided to relevant machine users 6. In other embodiments, the procedures may be stored in the machine monitoring system 16 and may be accessed by the machine user 6.

The maintenance management process 1000 may be implemented using a software running on the machine monitoring system 16, one or more machine users 6, computer hardware configured to perform the maintenance management process 1000. Machine users 6 may also leverage a computer system (such as, the machine monitoring system 16) to implement the maintenance management process 1000. Maintenance procedures, maintenance data, supplier data, machine codes, and other information related to the maintenance process may be stored in a database of the machine monitoring system 16, and may be accessible by machine user 6. Access to this information may be made locally through a local area network, or globally (for e.g., using the internet).

The disclosed maintenance management process 1000 may also employ an iterative approach to refine and optimize the maintenance management process 1000 by incorporating new learnings as and when they occur. Key Performance Indicators that track the performance of the maintenance management process 1000 may be used for the periodic optimization of the technique.

Since most maintenance tasks are executed before a failure actually occurs, repair events may be planned in advance to minimize the machine downtime during maintenance. Advance notice of maintenance events also minimize the impact of the machine down-time to the machine user 6. Also, since repair events are planned in advance, the repair events may be planned to coincide with other planned machine downtime (for instance, other plant maintenance times, holidays, seasonal slow-down, etc.) to further reduce the impact to the machine user 6. Additionally, for repair events that require a machine user 6 to travel to a worksite, advance planning of repair events allows the machine user 6 to perform multiple machine repairs in one trip, thereby saving time and money.

Iterative modification of the maintenance management process 1000 allows periodic modification of the maintenance technique to continuously improve by responding to changes in the worksite 10. This continuous improvement feature will ensure the optimal operation of the maintenance management system at all times.

It will be apparent to those skilled in the art that various modifications and variations can be made to the disclosed method of maintenance management. Other embodiments will be apparent to those skilled in the art from consideration of the specification and practice of the disclosed maintenance management method. It is intended that the specification and description be considered as exemplary only, with a true scope being indicated by the following claims and their equivalents.

What is claimed is:

1. A method of providing maintenance management of a machine comprising:
   identifying a machine component failure that if not repaired will result in a functional failure of the machine;
   assigning a criticality factor to the machine component failure based on at least a probability of occurrence of the functional failure and a consequence of the functional failure to a machine user;
   generating a maintenance task to repair the machine component failure;
   defining a triggering condition that activates the maintenance task;
   conducting a machine repair in response to a detection of the triggering condition;
   maintaining a record that includes information relating to the conducted machine repair;
   calculating performance indicators based on at least the record, the performance indicators including at least a work order backlog indicating a number of open work orders; and
   modifying the method of providing maintenance management based on at least the calculated performance indicators.

2. The method of claim 1, wherein identifying a machine component failure includes creating a list of machine component failures that affect a functionality of the machine.

3. The method of claim 1, wherein assigning a criticality factor includes determination of the probability of occurrence and the consequence based on discussions between the machine user and a service contractor.

4. The method of claim 1, wherein generating a maintenance task includes generating the maintenance task based on the criticality factor.

5. The method of claim 4, wherein generating a maintenance task includes:
   generating a preventive maintenance task;
   generating a predictive maintenance task; and
   generating a reactive maintenance task.

6. The method of claim 5, wherein generating a maintenance task further includes:
   assigning the preventive maintenance task to a machine component failure with an assigned criticality factor that exceeds a predetermined value.

7. The method of claim 5 wherein generating a maintenance task further includes:
   assigning the predictive maintenance task to a machine component failure with an assigned criticality factor that exceeds a predetermined value.

8. The method of claim 5, wherein generating a maintenance task further includes:
   assigning the reactive maintenance task to a machine component failure that results in a functional failure of the machine.

9. The method of claim 5, wherein defining a triggering condition includes:
   setting the triggering condition to activate the preventive maintenance task and the predictive maintenance task before the occurrence of the functional failure.

10. The method of claim 5, wherein defining a triggering condition includes:
    setting the triggering condition to activate the reactive maintenance task after the occurrence of the functional failure.

11. The method of claim 5, wherein modifying the method includes:

modifying the method to increase at least one of the predictive maintenance task and the preventive maintenance task and decrease the reactive maintenance tasks, based on at least the performance metric.

12. The method of claim 1, wherein the machine includes a turbine.

13. The method of claim 1, wherein maintaining a record includes:
recording one or more machine codes that include details of an unplanned machine failure.

14. The method of claim 13, wherein recording one or more machine codes includes:
recording information related to how the unplanned machine failure occurred and at least one symptom that was detected during or prior to the unplanned machine failure.

15. The method of claim 1, wherein the performance indicators further includes at least one of inventory growth year-to-date, inventory value, and part consumption.

16. The method of claim 1, wherein modifying the method further includes:
classifying the machine failure as a critical failure or a non-critical failure based on at least a potential effect of the machine failure on the machine user and a probability of the machine failure;
identifying the critical failure of the machine based on an indicator reflecting a likelihood of the critical failure;
conducting a first machine maintenance before an occurrence of the critical failure;
conducting a second machine maintenance after an occurrence of the non-critical failure;
determining an effectiveness of the maintenance management, the effectiveness including at least a percentage representation of a total number of first machine maintenance divided by a total number of first and second machine maintenance and recording one or more machine codes containing information on at least how the machine failure occurred and a symptom that was detected during or prior to the non-critical machine failure; and
modifying the method of maintenance management to increase the percentage.

17. The method of claim 16, wherein determining an effectiveness further includes:
computation of performance indicators in at least one of the areas of work management, inventory management or failure management.

18. A method of providing maintenance management for machines located at geographically separated worksites comprising:
classifying a failure of at least some of the machines based on a criticality of the failure to a functioning of the worksite, the machines including multiple first machines located at a first worksite and multiple second machines located at a second worksite geographically separated from the first worksite;
comparing the failures of the first machines to the failures of the second machines;
developing a predictive maintenance task based on the classification;
developing a preventive maintenance task based on the classification;
scheduling the preventive maintenance task to perform maintenance of a plurality of the first machines or a plurality of the second machines at a same time;
scheduling the predictive maintenance task to perform maintenance of a plurality of the first machines or a plurality of the second machines at a same time, where the preventive task and predictive task are scheduled during other planned machine downtime;
maintaining a record that includes information related to the performance of the maintenance;
calculating a performance metric based on the record; and
modifying the method of providing maintenance management based on at least the performance metric.

19. The method of claim 18, wherein, modifying the method includes modifying the method by comparing the performance metric to a second performance metric, the second performance metric being a previously calculated performance metric.

20. The method of claim 19, wherein the performance metric and the second performance metric are calculated at two different worksites.

21. The method of claim 18, wherein the first machine includes a plurality of turbines and the second machine includes a plurality of turbines.

22. The method of claim 18, further including scheduling the predictive maintenance task and a preventive maintenance task in one or more of an inventory management system and a personnel scheduling system.

23. The method of claim 18, wherein developing a predictive maintenance task includes estimating a time of failure based on readings from a sensor coupled to the machines.

* * * * *